Sept. 5, 1967     E. G. KRAKAUER ET AL     3,339,593
SPRING ASSEMBLING MACHINE
Filed May 7, 1965     3 Sheets-Sheet 1
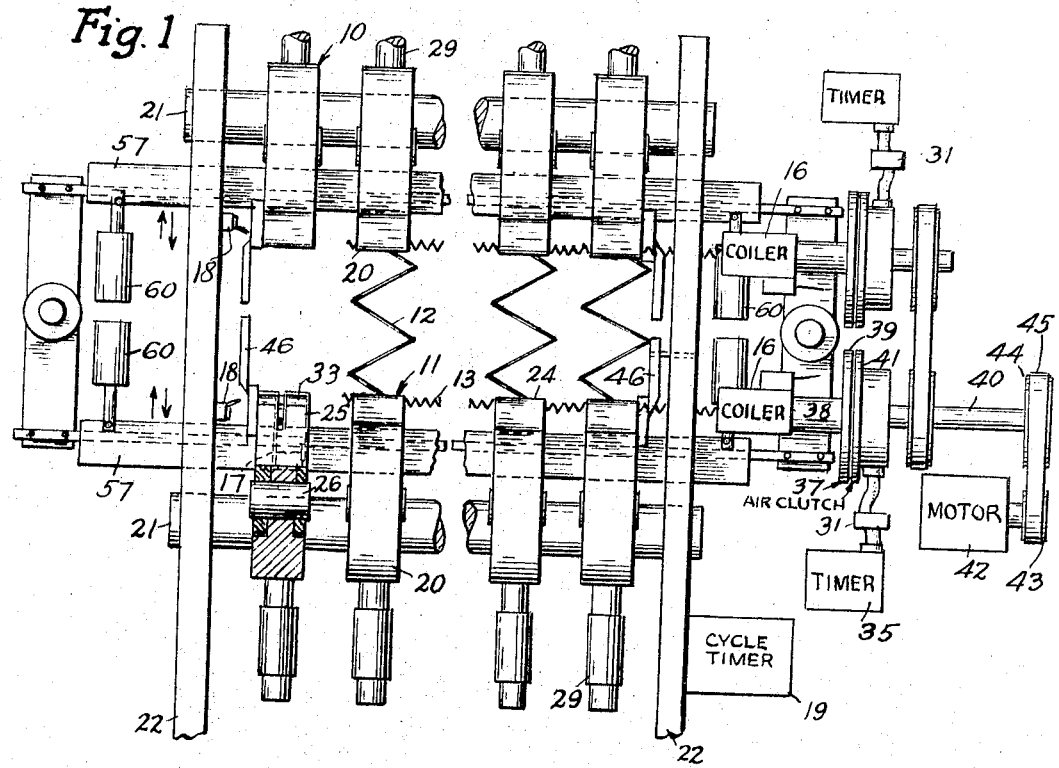
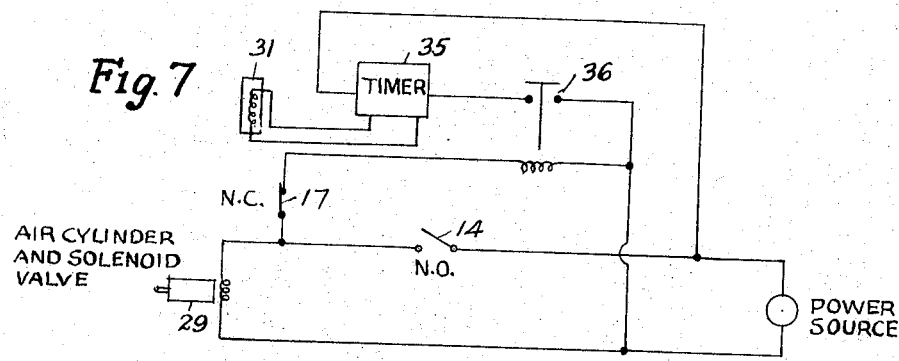
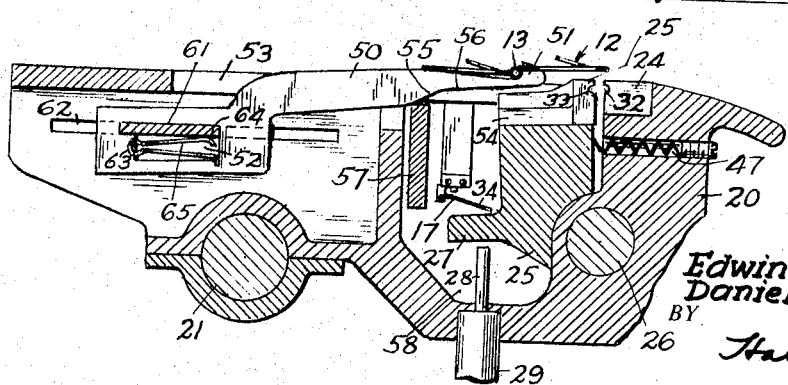
INVENTORS.
Edwin G. Krakauer
Daniel Krakauer
BY
Harry Jacobson
ATTORNEY

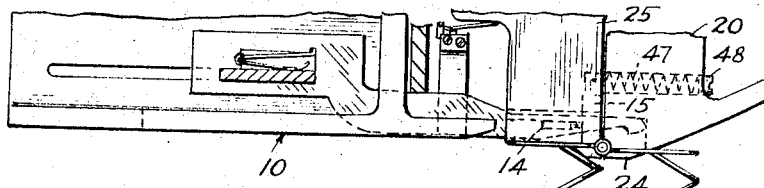

Sept. 5, 1967  E. G. KRAKAUER ETAL  3,339,593
SPRING ASSEMBLING MACHINE
Filed May 7, 1965  3 Sheets-Sheet 3
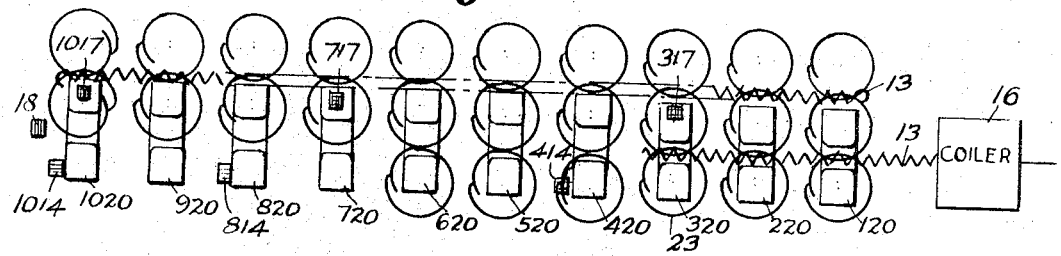
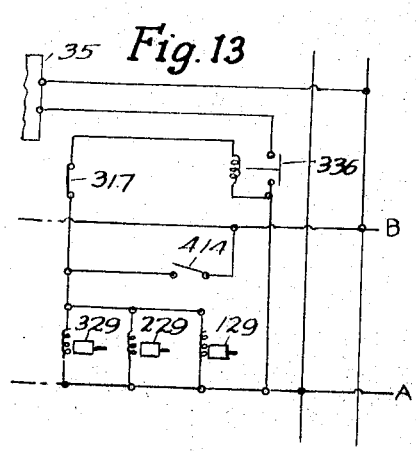
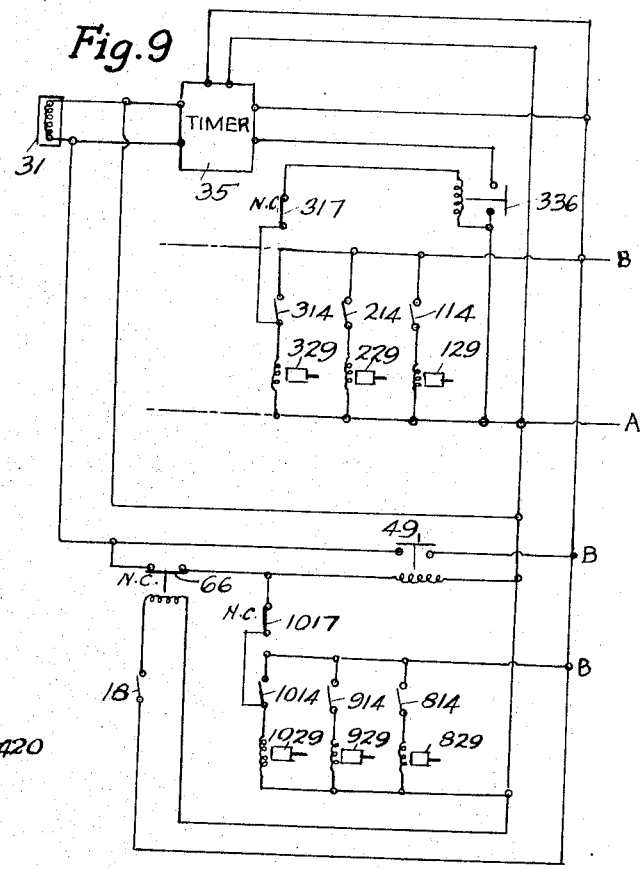
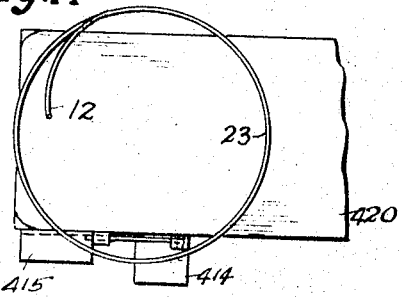
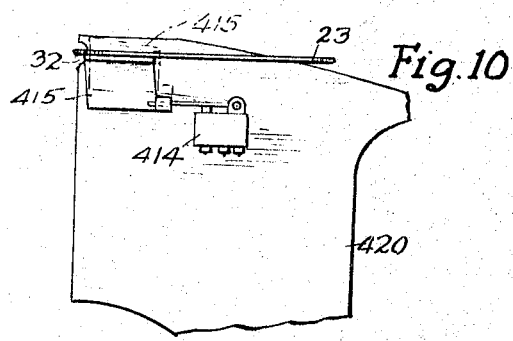
INVENTORS
Edwin G. Krakauer
Daniel Krakauer
BY
Harry Jacoban
ATTORNEY

United States Patent Office 3,339,593
Patented Sept. 5, 1967

3,339,593
SPRING ASSEMBLING MACHINE
Edwin G. Krakauer, Roslyn Heights, and Daniel Krakauer, Great Neck, N.Y., assignors to Kay Manufacturing Corp., a corporation of New York
Filed May 7, 1965, Ser. No. 453,965
20 Claims. (Cl. 140—92.8)

ABSTRACT OF THE DISCLOSURE

The jaws of one or more spring holding units of a row are closed when a spring is inserted into a selected unit of the row. The inserted spring closes a switch and initiates operation of a wire coiler which forms and advances only part of a tying helical after causing the jaws to close. More of the helical is formed and advanced step by step to keep pace with the insertion of springs into selected units. After the row is tied, the rows are advanced by a hook moving into the jaws and moving the tied rows inwardly out of the jaws and also rearwardly. The operator does nothing but insert springs. All other cyclic operations customary in spring assembling machines are automatic and are controlled by such spring insertion and by sequentially operated controls.

---

This invention relates to machines for tying rows of upright coil springs together by means of helical tie wires known in the industry as, and hereinafter termed "helicals," and is directed particularly to the automatically operated and controlled spring-gripping tying and transfer mechanisms of such machines.

The invention has for one of its objects, the provision of means, responsive to the insertion of the end coil of an individual spring into a selected jaw unit of a row of such units for forming and advancing part of the length of a helical to and around such end coil or the end coil of one or more of the preceding springs in the row, regardless of the position of said unit in the row, whereby the tying operation keeps pace with the row forming operation, in distinction from previous machines wherein automatic formation of the helical and the advance thereof cannot begin until the insertion of coil springs into the entire row of jaw units has been completed.

Another object of the invention is the provision of means for reducing the time lag between the time the last spring of one row has been inserted into the machine and the time when the insertion of the first spring into the succeeding row has commenced, thereby to speed up the production of the machine by avoiding the need for waiting between successive row-forming operations until the machine forms and advances a helical the full length of the row of springs.

A further object of the invention is the provision of means responsive to the inserting movement of a spring into the machine for forming, at predetermined intervals only, predetermined relatively short portions or lengths of the tying helical, each short length being less than the length of a row of jaw units and reaching only up to a selected spring-holding jaw unit intermediate of the ends of the row, or to any preceding unit whereby the operator of the machine, in cases where the springs are inserted into the machine manually, is enabled to devote all his attention to the spring-inserting operation without the necessity of performing any other operations on handles, wheels, levers, switches or other controls.

A still further object of the invention is the provision of simple and efficient transfer mechanism including a suitable hook to which both vertical and horizontal movement is given, for removing the tied rows from the jaw units and for advancing the tied rows together with the previously tied spring assembly into position for the addition and tying to the assembly of the succeeding row of springs.

Another object of the invention is the provision of a simple spring assembling machine adapted for the manual or mechanical reception of individual springs and adapted for operation at relatively high speeds without danger to the operator or mechanism.

Other objects of the invention will appear as the description progresses and from the drawings, in which FIG. 1 is a fragmentary front elevational and partly diagrammatic view of the machine considerably foreshortened by the omission from the rows of a number of the identical spring-receiving jaw units and the switches on the omitted units.

FIG. 2 is a fragmentary side elevational view, partly in section, of a typical cooperating pair of upper and lower jaw units, showing a pair of springs of adjacent rows held in tying position by the closed jaws of the units, and showing coiler control switches which trigger the timer into operation.

FIG. 3 is a fragmentary vertical sectional view of the lower unit, taken on the line 3—3 of FIG. 2.

FIG. 4 is a fragmentary top plan view of the lower jaw unit in the open position thereof showing the lower coil of a spring about to close the normally open jaw-closing switch.

FIG. 5 is a fragmentary vertical sectional view of the open jaw unit, taken on the line 5—5 of FIG. 4.

FIG. 6 is a top plan view similar to FIG. 4 showing the jaws of the unit closed and the helical formed and advanced into and just past the tying position.

FIG. 7 is a highly simplified general wiring diagram with minor connections omitted of the control for initiating operation of the coiler timer each time a spring is inserted into a jaw unit.

FIG. 8 is a fragmentary vertical sectional view similar to FIG. 5, of a jaw unit having a normally closed auxiliary coiler control switch, showing the switch closed and the jaws in the normally open positions thereof and with the transfer lever moving a pair of tied rows of springs out of the jaws.

FIG. 9 is the wiring diagram for the jaw closing means for each individual unit as applied to the first three units in the row and to the last three units showing the connections in more detail than in FIG. 7 and also showing the connections to the coiler and for by-passing the timer for the units at the end of the row.

FIG. 10 is a fragmentary elevational view of a modified form of the arrangement of, and actuating means for, the jaw closing switch.

FIG. 11 is a top plan view of FIG. 10.

FIG. 12 is a diagrammatic plan view of the row of jaw units showing the switch arrangement for group closing of the units in accordance with the wiring arrangement of FIG. 13 and also showing the jaws of the first three units of the row closed and springs inserted into the open jaws of the next three units, the space between the jaws of each unit being greatly exaggerated for clarity of illustration.

FIG. 13 is a fragmentary wiring diagram similar to FIG. 9 of the connections for group closing of the set of the first three units of the row by a single switch as in FIG. 12.

The wiring and switch arrangement may take various forms in the machine, depending on how many or how few units in the row of such units are to be closed simultaneously and on which of the units are arranged the switches controlling the closing of the jaws. In one form, the jaw closing switch is on the unit following that set of such units which are to be closed by said switch. In another form, each unit carries a jaw closing switch so that no unit remains open while there is an untied spring therein. In that case, the unit is closed immediately on the insertion of a spring thereinto but such prompt jaw closing may be disturbing to some operators. The other form may be preferred, in which the jaw closing switch does not close the jaws of the unit on which the switch is arranged, and consequently does not produce a jar or shock felt by the operator during the manual insertion of springs into the machine.

The individual jaw closing and set or group jaw closing machines illustrated by way of example comprise an upper series of jaw units 10, and a lower series of jaw units 11, all of which are substantially identical except for the location of the switches controlling closing of the jaws, and the coiler control switches later to be described in detail. Said units receive between them, preferably in an upright position, the coil springs 12 which are to be tied together by means of the helicals 13. Since the upper and lower seres of jaws and the operating mechanisms therefor are substantial duplicates of each other, a description of one series will suffice for both, it being understood that each series operates independently of the other series, and that each jaw unit or group of units in the same series also is an individual unit or group, operating independently of the operation of the remaining units or groups in the same series except when all the jaws of the various units are opened simultaneously to release and to advance the tied assembly.

In general, means are provided for severing and bending both ends of the tying helical after it has been formed in intermittent and automatically controlled fragments or steps to its full length by a coiler and advanced to the end of the row of springs inserted consecutively between the jaws of successive jaw units. Means are also provided for advancing the tied-together or previously assembled rows of springs so that a succeeding row may be inserted between the jaw units and tied. No mechanism is shown herein for inserting the springs into the jaw units, since the manner of so inserting the springs is optional and may be done mechanically or manually. As indicated hereinbefore, if done manually, the operator of the machine is not distracted by the necessity for pressing buttons or manipulating levers, handles or the like, but may concentrate all of his attention on the insertion of the springs as rapidly as possible into the row to be tied. Whether the springs are inserted mechanically or manually, the lowermost coil of the spring is inserted into the lower jaw unit by pushing said coil rearwardly far enough to engage the switch lever as 15 which closes the jaw control switch 14 (FIGS. 4-6) and also at about the same time, doing the same with the upper coil by inserting it into the corresponding upper jaw unit directly above, and upside down relatively to, said lower unit.

Certain pairs of corresponding jaw units are provided with auxiliary switches 17 which cooperate with switches 14 in controlling the coilers 16. Said coilers are timed to form and advance predetermined fractional lengths of the helicals 13 intermittently. Each of such pairs of jaw units consists of a lower unit and that upper unit directly above it. The pairs of units selected for equipment with coiler control switches may be juxtaposed in the row of units or may be separated by interposed units as far apart as may be required, as shown in FIG. 12, depending on the skill and speed of the operator who inserts the springs successively and consecutively into the jaw units, or the speed of the mechanical feed of such spring into the jaws. It has been found to be practical and convenient to make a coiler control connection to a switch 14 on approximately every third jaw unit in the row thereby starting and stopping operation of the coilers on the insertion of every third spring of the row of springs into the units.

As shown in FIG. 12, the row has ten units designated by reference numerals in which the first digit or first two digits correspond to and designate the position of the unit in the row. Similarly, the switch 317 is on the third unit 320, switch 717 is on the seventh unit 720, and switch 1017 is on the last unit 1020. Consequently, switch 317 controls operation of the coiler to form and advance the helical 13 up to the third unit 320, switch 717 permits the coiler to form and advance the helical a similar length and switch 1017 permits the operation of the coiler to the end of the row. Switch 1017 is on the last unit and causes the coiler to run continuously independently of the timer 35 as will be later explained, until the coiler is stopped. This occures when the completely formed helical engages the switch 18 at the end of the row. In addition to stopping the coiler, the row end switch 18 starts the cycle timer 19 controlling the operation of the various mechanisms for severing the helicals, opening the jaws of the jaw units, lifting the tied or previously assembled rows of springs out of the jaws, advancing the assembled springs and returning the spring advancing means to the initial positions thereof.

FIGS. 2-6 show the typical jaw unit in detail. Said unit comprises the fixed jaw carrying frame 20 removably and adjustably mounted on the shaft 21 supported in the side frames 22 of the machine, said shaft carrying all of the units of one row. The front end of the jaw frame is suitably inclined to permit the easy inserting movement of the lowermost coil 23 of the spring 12 past the fixed jaw 24 of the jaw frame of the lower unit and similarly to permit the uppermost coil of the spring to be inserted into the jaws of the upper corresponding unit, the spring being held in place between the upper and lower units under slight compression as it is advanced between the converging ends of the upper and lower units. The movable jaw 25 is pivotally mounted for oscillation in the jaw frame by means of the fixed stud shaft 26 and is provided with a suitable shoulder or lug 27 extending rearwardly and engaged by the push rod 28. Said rod reciprocates in the air cylinder 29 under the control of a suitable solenoid valve such as a spring-returned valve associated with the cylinder in a manner which is well understood and needs no further description nor illustration. Suitably connected electrically to the valve of the air cylinder is the jaw closing switch as 14 shown in FIGS. 2 and 5, mounted on the movable jaw of each unit or of spaced-apart selected units. Said switch has a plunger 30 in the path of the switch-operating lever plate 15. As best seen in FIG. 5, said plate is pivotally mounted at the upper part of the front edge of the movable jaw in a position to be swung in a counter-clockwise direction by the end coil of the spring when the spring is moved rearwardly into the combined recesses 32, 33 just below the upper surfaces of the respective jaws 24 and 25 and into which recesses the plate 15 projects slightly. When the end coil strikes the lever plate 15 and swings it rearwardly during the insertion of the spring into the unit, the plate moves the switch plunger toward the left and closes the normally open switch 14, thereby energizing the solenoid valve as shown in FIG. 7 to admit air into the air cylinder 29 and to move the push rod 28 in the direction to swing the movable jaw clockwise as viewed in FIGS. 2 and 5. The jaws are consequently closed upon and grip the end coils of the newly inserted spring and the overlapped spring in the preceeding row. While each of the units carries a push rod 28 and an air cylinder 29, neither a solenoid valve nor a switch 17 is necessarily mounted on each unit, as has been indicated, though FIG. 7 shows a simplified and generalized form of wiring suitable for a single unit. Since the jaw units are multiplied, the wiring is more elaborate as will be understood. Furthermore, the switch 14 may be located on a unit other than that carrying the jaws which are to be closed, as for group closing, or avoidance of objectionable mechanical shock to the operator. A single solenoid valve may well control the air cylinders of a group of jaw units in a similar manner, as is explained hereinafter.

As shown in FIG. 9, closing of the switch 114 on the first unit 120 closes the circuit from the power lines A and B to the solenoid valve 129 and the jaws of the first unit; closing of the switch 214 by the insertion of a spring into the unit 220 closes the circuit to the valve 229 and the insertion of a spring into the third unit 320 closes the switch 314 on the unit and the valve 329 and jaws of said third unit. It will be understood that additional switches of the jaw closing control type 14 and solenoid valves are mounted on the remaining units in the same manner as shown for the first three units and need not be shown nor further described in connection with the individual type of jaw closing for the units.

The jaw closing operation occurs at the upper end coil as said coil is inserted into the upper jaw unit in the same manner as described for the lower unit. The overlapping end coils of the corresponding springs in the two rows mentioned are thereby suitably held in the recesses 32 and 33 ready for the winding thereabout of the tying helical. Each of said recesses has a substantially semi-cylindrical wall of the proper diameter to permit the helical to rotate therein and to pass therethrough into its tying position around the end coils.

As has been indicated, the mere closing of the jaws of a unit may, but does not necessarily, initiate operation of the coiler which forms and advances the helical. It is only that jaw unit which is equipped with a coiler control type switch 14 which initiates operation of the coiler. The auxiliary switch 17 cooperates with the main switch 14 to trigger operation of the coiler, but its main function is to insure that the timer stops operation of the coiler at the end of each cycle of the timer. In the selected jaw unit which employs such type 17 switch, the switch is mounted on the jaw frame and is provided with a pivoted switch actuating lever 34 spring-pressed into the normal switch closing position thereof and arranged in the path of the movable jaw lug 27. The switch 17 is open when the jaws are closed completely as shown in FIG. 2. When the jaws are open as shown in FIGS. 4, 5 and 8, the switch 17 is closed as best seen in FIG. 8. However, during the insertion of a spring into the unit (FIGS. 4–6) the spring closes the switch 14 so that during the movement of the jaws from the open to the closed position thereof, both switches 14 and 17 are closed at the same moment only, which is just before the jaws close completely. Since the combined action of the switches 14 and 17 is similar to that of a slow action relay, it may be replaced by such relay in a manner which is well understood and need not be illustrated.

The momentary closed position of both switches 14 and 17 just before the jaws are completely closed, energizes the timer 35 for the coiler 16. As will be seen from the wiring diagrams of FIGS. 7 and 9, when both switches or similar switches are closed an electrical impulse is given to the relay 36 or 336 in the circuit to the timer 35, temporarily closing the circuit to the timer and triggering it into operation for the predetermined time or number of revolutions for which it has been set. The circuit to the relay 36 or 336 is opened when the normally closed switch 17 or the like is opened on the movement of the jaw lug 27 into the position which completely closes the movable jaw upon the fixed jaw. As shown in FIG. 1, the timer 35 controls the operation of a suitable solenoid valve as 31 which in turn controls the duration of the flow of air under pressure to the air clutch 37 which is mechanically connectable and disconnectable to and from the coiler 16 by the outer hollow shaft 38 on which the coiler is mounted and which shaft is connected to one disc 39 of the clutch. The inner shaft 40 of the clutch is connected to the other disc 41 and is driven by the motor 42 through suitable connections such as the pulleys 43, 44 and belt 45 shown. It will be understood that the clutch disc 41 is moved axially by the air pressure permitted by the timer to press said disc into operative engagement with the cooperating clutch disc 39 so long only as the timer remains in operation, which is just sufficient to form and advance a predetermined set fraction of the length of the helical.

The spring inserting operation for the rows of springs thereby controls the starting and stopping of the coiler at the desired time or space intervals suitable virtually to eliminate any material time lag between the coiling and spring inserting operations, whether the latter operation is done manually or mechanically. In other words, when the complete row of springs has been inserted, the springs have also been tied by the helicals and the assembled springs quickly advanced and the insertion of the next row of springs into the machine can be started without delay and without any other steps being taken.

As shown in FIG. 9, when the jaw closing switches 814, 914 and 1014 are closed to start closing of the jaws of the units 820, 920 and 1020, current passes through the normally closed switch 1017 just before it opens and also passes through the closed switches 814, 914 and 1014 to energize the relay 49 thereby to close the circuit to the air clutch solenoid 31 independently of the timer to complete the formation and advance of the helical to the end of the row, the timer 35 being by-passed for the last few units to compensate for any irregularities in the length of the theretofore formed helical.

When the helical reaches the row end switch 18 and closes said switch, the normally closed relay 66 is opened, deenergizing the relay 49 opening the circuit to the solenoid valve 31 and stopping the coiler. At the same time, the switch 18 closes the circuit to the cycle timer 19 which controls further operation of the machine. As has been briefly indicated hereinbefore and as is now well understood, various operations are performed before the assembled springs are advanced to make room for the insertion of the next row of springs into the jaw units. First, the cycle timer initiates the severance and clinching of the helical at both ends of the machine as shown in FIG. 1. This operation is performed by the cutters 46 illustrated diagrammatically. All of the jaws in the various units of the rows are then opened by the opening of the circuits to the solenoids of the air cylinders 29 and the like, thereby permitting the jaw-opening spring 47 of each unit (FIG. 2) to move the movable jaw to the left to its open position. The spring 47 is suitably mounted in the fixed jaw for that purpose and is held in place by a suitable screw as 48 and thereby urges the movable jaw toward its open position.

The jaws having been opened at the completion of the tying of the row of springs, the spring assembly is now advanced rearwardly by the transfer mechanism provided for each jaw unit. The assembly is advanced by lifting the last tied pair of rows out of the recesses 32, 33 and then shifting the entire assembly until the front portions of the end coils of the front row of springs are halted by the wall of the recess 33 in the movable jaw. A peculiar motion is given to the transfer lever 50 which is preferably provided in each jaw unit to advance the assembly. Said lever terminates in the hook 51 at its forward end and has the horizontal slot 52 near its rear end. The lever oscillates about a reciprocatory fulcrum near its rear end. It also reciprocates in the slot 53 extending downwardly from the top surface of the jaw frame 20, and operates in the slot 54 in the movable jaw 25. In its normal inoperative position, the lever rests in the longitudinally aligned slots 53, 54 below the upper surface of the frame 20 and with the hook 51 in front of and somewhat below the rear part of end coil 23 of the front spring in the jaws. The cam portion 55 in the lower edge 56 of the front reduced part of the lever, is in front of the lever-raising bar 57 which is vertically reciprocated at the proper time, as shown by the arrows of FIGS. 1 and 2, to raise the hook 51 and to permit the hook to drop. The bar 57 passes loosely through an opening 58 in the jaw frames 20 in the entire row of units and engages the lower edges of all of the transfer levers 50 of the row. A suitable solenoid valve and air cylinder 60 at each end of the bar 57 is controlled by the cycle timer 19, the rod of said cylinder being suitable connected to the bar 57 as shown in FIG. 1 to raise and lower said bar and thereby to raise the hooks 51 and the coils 23 toward the positions thereof shown in FIG. 8 and to allow the hooks to drop when said bar moves downwardly or away from the edge 56 of the lever.

To reciprocate the transfer lever horizontally, the horizontally reciprocating bar 61 passes through the slots 52 in all of the levers 50 of the row and also passes through and is guided by the suitable slots 62 in the frames 20. A suitable U-shaped blade spring 63 urges the bar 61 against the top wall of the lever slot 52 while permitting the lever to rock on the bend 64 or other moving fulcrum near the forward end of the upper arm 65 of said spring when the hook 51 is alternately lifted by the bar 57 and released thereby. When the cycle timer 19 is energized, all of the jaws are opened by the springs 47, the bar 57 is raised to raise the hooks 51 into position to engage the just tied lower coils of the rows while the bar 61 moves rearwardly to cause the hooks to grip the springs and to carry the entire spring assembly rearwardly until halted, the bar 57 remaining raised until the cam portions of the levers move rearwardly therepast and permit the reduced parts and the hooks of the levers to drop and to lower the assembled springs. The bar 57 then drops followed by the return movement of the levers along with the bar 61 to the inoperative positions thereof shown in FIG. 2, ready for the repetition of the cycle.

It will be understood that while the above description has been directed primarily to a lower jaw unit, it applies as well to the upper jaw units provided that the vertical positions of the parts and the vertical movements be understood as reversed in direction from that just described since the upper units 10 are upside down relatively to the lower units 11.

For group closing of a set of preceding units in the row, jaw closing preferably does not depend on the insertion of springs in the set of units to be closed, but is controlled by the insertion of a spring in some unit following said set, the jaws of the preceding set of units temporarily remaining open. As shown in FIGS. 12 and 13, the single jaw closing switch 414 on the fourth unit not only controls operation of the jaw closing solenoid valves 129, 229 and 329 on the respective preceding units 120, 220 and 320 but also triggers the relay 336 which activates the timer 35. Similarly, the jaw closing switch 814 also triggers an appropriate relay similar to the relay 336 and operates the air cylinders and solenoid valves on the units 420, 520, 620 and 720 to close the jaws of that group of units.

At the end units of the row, the switch 1014 controls the closing of the jaws of the units 820, 920 and 1020 through the respective air cylinders on said units through a suitable circuit. Such circuit may be similar to that shown in FIG. 13 for the switch 414. However, the switch 1017 corresponds to the switch 317 of FIG. 13 while the end switch 18, and relays 49 and 66 replace the relay 336, and other similar relays to permit the timer to be by passed and the coiler solenoid 31 to be energized and to complete the helical formation.

The jaw closing switch as 14, or 414 or the like, need not necessarily be arranged on the movable jaw. In the form of such switch shown in FIGS. 10 and 11, the switch as 414 is mounted on the fixed jaw or frame 420 and is actuated by the lever 415 arranged in the path of the end coil 23 of the spring. Normally, when the jaws are empty, the actuating lever is urged to the position thereof shown in dash-dot lines, wherein the upper substantially horizontal flange of the L-shaped lever is urged by a suitable spring coiled around the pivot for the lever or in the switch, to the position shown above the recess 32 and in the path of the spring coil 23. That portion of the end coil projecting past the sides of the fixed jaw, engages and depresses the flange of the lever on its way into the jaws, and rotates the lever about its pivot on the switch in a counterclockwise direction as viewed in FIG. 10 to close the switch and to energize the jaw closing solenoids.

It will also be understood that various obvious changes may be made in the specific forms of the invention shown and described herein without departing from the spirit of the invention defined by the appended claims.

We claim:

1. In a spring assembling machine, means for intermittently forming and intermittently advancing a helical, a jaw unit having closeable spring-holding jaws, means responsive to the insertion of a spring into the machine for closing the jaws and means responsive to the closing of the jaws for controlling the intermittent operation of the first mentioned means.

2. The machine of claim 1, the controlling means comprising a timer limiting the extent of the helical fragment formed and advanced at each intermittent operation of the helical forming and advancing means.

3. The machine of claim 1, the jaw-closing means comprising a switch in the path of the spring inserted into the jaws of a unit and mechanism controlled by the switch for closing the jaws.

4. The machine of claim 1, the first mentioned means comprising a coiler and the last mentioned means comprising a switch in the path of a jaw of a unit and mechanism responsive to the switch for operating the coiler to form and to advance a fractional part of the length of the helical.

5. The machine of claim 4, the jaw-closing means comprising a second switch closed by the spring inserted into the jaws and an operative connection between the second switch and one of the jaws.

6. In a spring assembling machine, a row of normally open jaw units, first means responsive to the insertion of a spring into a unit for closing the jaws of at least one unit other than the succeeding units in the row and second means responsive to the closing of the jaws as aforesaid for forming part of a tying helical and advancing the helical to a point along the row not substantially beyond the last unit in which the jaws have been closed.

7. The machine of claim 6, and third means for advancing assembled springs when said helical reaches the end of the row, the second means operating intermittently in response to the successive insertion of springs into the jaws of selected successive units in the row.

8. The machine of claim 6, the second means comprising a switch operated by one of the jaws, a timer controlled by the switch and a coiler controlled by the timer.

9. The machine of claim 6, the first means comprising a switch in the path of insertion of said spring and means energized on closing of the switch to move one jaw toward the other jaw.

10. The machine of claim 9, the second means comprising a second switch operated by one of the jaws, a coiler and an operative connection between the second switch and the coiler.

11. In a spring assembling machine, a row of a plurality of spring receiving units, a coiler, and means responsive to the insertion of a spring into successive intermediate selected units of the row for automatically operating the coiler intermittently to form and to advance a fractional part of the spring-tying helical formed by the coiler from a point in proximity to one of said selected units toward and into proximity to the succeeding selected unit of the row.

12. The machine of claim 11, each of the row of units having a movable jaw and a fixed jaw, and means responsive to the completion of the formation of the helical for severing the helical, opening the jaws of all of the units and advancing the helical-tied springs rearwardly to complete the cycle of operations of the machine, the coiler being controlled by the first mentioned means to keep pace substantially with the successive insertion of springs into the jaws of the selected units.

13. The machine of claim 11, at least one of the units between the ends of the row having a switch responsive to the insertion of a spring into the unit to clamp at least one of the springs at a selected unit, the coiler operating means being responsive to the clamping of a spring by various successive units in the row.

14. The machine of claim 11, the units of the row being normally open spring clamping units, the coiler operating means including means for automatically closing only selected intermediate units of the row thereby to clamp a set of springs in said selected units on the insertion of springs into other intermediate units of the row and to render the coiler operating means repeatedly operative between the clamping of successive sets of less than a complete row each.

15. In a spring assembling machine, means to remove and to advance a spring assembly having tying helicals after the completion of the formation of a tying helical, said means comprising a hook, means for holding the end coils of a row of springs in position for the tying thereof by a helical, and means for moving the hook in a path having vertical and horizontal components to one position outwardly of those coils held by the coil holding means, to another position inwardly of said one position to compress the springs and to move the end coils out of the coil holding means and then to advance the assembly rearwardly while engaged by the hook.

16. The machine of claim 15, a lever having the hook at the front end thereof, the means for moving the hook comprising a first vertically reciprocating bar, a second horizontally reciprocating bar, the lever having a slot in the rear portion thereof receiving the second bar, and a blade spring in the slot engaging the second bar and the lever and slidable therewith as a unit.

17. In a spring assembling machine, means to advance a spring assembly after the completion of the formation of a tying helical comprising a transfer lever adapted to engage the spring assembly, means for raising the front end of the lever and means for advancing the lever rearwardly a predetermined distance while the front end of the lever engages the assembly, a row of jaw units each having a fixed jaw and a movable jaw, means on each unit in the row responsive to the insertion of a spring into the jaws of said unit for closing the jaws, helical-severing cutters at the ends of the row, means at the end of the row for activating the cutters when the formed helical reaches said means, and means for opening the jaws of all the units after the cutters have severed the helical.

18. In a spring assembling machine, a row of jaw units each having closeable jaws, means on a unit responsive to the insertion of a spring, into a unit of the row for closing the jaws of a number of consecutive selected units, a coiler, means responsive to the insertion of springs into successive selected units of the row for operating the coiler intermittently to form and to advance a spring-tying helical toward said successive units in succession, helical-severing cutters at the ends of the row, means at the end of the row for activating the cutters, means for opening the jaws of all the units after the cutters have severed the helical and means to advance the tied springs.

19. The machine of claim 16, a fixed frame for each unit having a first slot therein for the reception and longitudinal movement of the lever and having a second slot therein overlapping and extending past the slot in the lever for the passage therethrough and movement longitudinally therein of the second bar.

20. In a spring assembling machine, coil-holding means for the terminal coils of adjacent rows of springs preparatory to the tying of said coils, means to remove from the coil-holding means and to advance said rows after the tying helical has been formed and the rows tied thereby, the coil-removing and advancing means comprising a reciprocating and oscillating hook, means to move the hook forwardly into the coil-holding means and into a first position therein outwardly of the terminal tied coils, to move the hook inwardly into a second position inwardly to compress the springs held by the coil-holding means and into a third position rearwardly of the first and second positions while the hook engages the tied coils.

References Cited
UNITED STATES PATENTS

| | | | |
|---|---|---|---|
| 2,172,483 | 9/1939 | Taylor | 140—92.4 |
| 2,262,994 | 11/1941 | Dickey | 140—92.94 |
| 2,888,960 | 6/1959 | Gail | 140—92.8 |
| 3,045,714 | 7/1962 | Greeno et al. | 140—92.94 |

CHARLES W. LANHAM, *Primary Examiner.*

L. A. LARSON, *Assistant Examiner.*